Oct. 5, 1965

C. E. MILLER 3,210,582

MAGNETO HAVING AUXILIARY POLE PIECE

Filed July 26, 1960

INVENTOR.
CLARENCE E. MILLER
BY
MAHONEY MILLER & RAMBO ATTY'S.

BY

United States Patent Office 3,210,582
Patented Oct. 5, 1965

3,210,582
MAGNETO HAVING AUXILIARY POLE PIECE
Clarence E. Miller, 1430 E. Main St., Lancaster, Ohio
Filed July 26, 1960, Ser. No. 45,454
2 Claims. (Cl. 310—156)

The present invention relates to electrical magnetos, and more specifically to an improved means for increasing the output efficiency of a magneto, particularly during relatively slow speed operation thereof.

Magnetos of the type used to supply ignition current for aircraft and relatively large size industrial-type internal combustion engines are generally characterized by a marked decrease of output efficiency when the engine is operating at relatively slow speeds, say for example 10 to 100 r.p.m. This decrease in output efficiency at slow speeds is directly attributable to the proportionate decrease in the speed of rotation of the rotating magnet component of the magneto, which magnet is driven in rotation by the associated engine and, in turn, functions upon rotation to induce voltage in the associated magneto coil or coils from whence electrical current is caused to flow at properly timed intervals to produce a spark at each of the spark plugs of the engine. As will be readily understood by those familiar with the operation and component parts of the usual magneto, the rotating magnet, or rotor, functions upon rotation to cause flux reversals or changes in flux linkages in the coil core of the magneto about which the magneto coil or coils are wound. The rate of change of flux linkage is directly proportional to the speed of rotation of the rotating magnet of the magneto and the induced voltage in the magneto coil is increased in direct proportion to the rate of change of flux linkage within the coil core. Hence, the electrical output of the magneto is increased with an increase in the speed of rotation of the rotating magnet, or rotor, of the magneto. As will also be readily understood by those skilled in the art, the rotating magnet or rotor element of the magneto is usually driven by the associated engine through an appropriate gear train which inherently, due to gear tooth clearance, provides at least minimal slippage or limited independent rotational movement of the rotating magnet with respect to the engine drive shaft or other magneto drive member of the engine.

Accordingly, the primary object of the present invention is to provide an efficient, yet mechanically simple and inexpensive means for increasing the speed of rotation of the rotating magnet of a magneto at the time the magnet reaches or closely approaches the positions at which it causes a maximum reversal of flux linkages within the coil core of the magneto (E gap positions), to thus increase the electrical output efficiency of the magneto.

Another object of the invention is to provide in a magneto a relatively small and compact auxiliary pole piece of non-permanent magnetic material which is so arranged in relation to the usual rotating magnet and the coil core pole shoes as to increase the speed of rotation of the magnet as the latter closely approaches the position at which it causes a maximum change of flux linkages in the associated coil (magneto fire positions), thereby increasing the rate of change in flux linkages and the electrical output of the magneto.

For a further and more detailed understanding of the present invention and the additional objects and advantages ambient thereto, reference is made to the following description and the accompanying drawing wherein.

Figure 1:
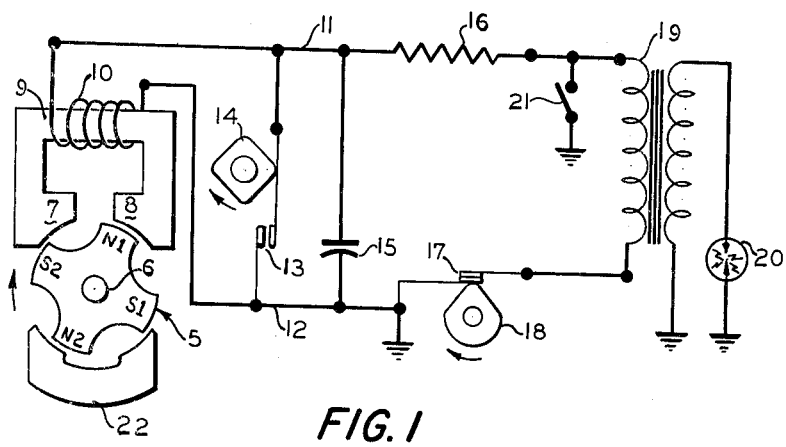
FIG. 1 is a schematic wiring diagram of a low tension magneto embodying an auxiliary pole piece formed and arranged in accordance with the present invention.
Figure 3:
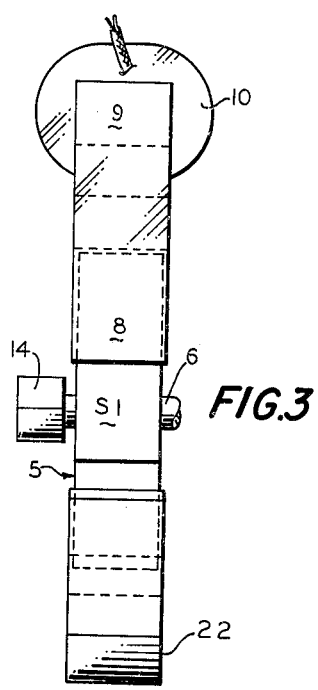
FIG. 3 is a side elevational view of the structure shown in FIG. 2.

Referring now to the drawing, FIG. 1 illustrates, in diagrammatic form, a magneto embodying the auxiliary pole piece of the present invention. The reference numeral 5 designates the usual rotating magnet or rotor having four radially extended, circumferentially spaced poles $N_1$, $S_1$, $N_2$ and $S_2$ of alternately opposite polarity. The magnet 5 is arranged to be driven in rotation by a shaft 6 which, in the usual manner, is driven in rotation through a suitable engine-driven gear train, not shown.

Stationarily mounted in the plane of rotation of the magnet and in relatively closely spaced, spanning relation to a peripheral segment of the magnet 5 are the relatively spaced pole shoes 7 and 8 of the usual coil-supporting core 9 of the magneto. As will be noted, the pole shoes 7 and 8 terminate adjacent the magnet in arcuate surfaces 7a and 8a disposed in closely spaced concentric relation to the peripheral surfaces of the poles of the magnet 5. Wound about the core 9 is the usual induction coil 10 in which voltage is induced upon rotation of the magnet 5. The opposite ends of the coil 10 are connected with the lead wires 11 and 12. Electrically connected between the leads 11 and 12 is a normally closed breaker switch 13 which is adapted to be opened at timed intervals by the peaks of a breaker cam 14 which is keyed to, or otherwise suitably carried in rotation by, the magnet shaft 6. In this regard, it will be understood that the peaks or nodes of the breaker switch cam 14 are so correlated or indexed with respect to the poles of the magnet as to open the breaker switch 13 each time the magnet 5 reaches the positions (E gap positions) at which it causes a maximum change or reversal of flux linkages in the coil core 9. Thus, during each revolution of the four pole magnet 5, there are four reversals or maximum changes of flux linkages within the core 9, and the cam 14 is set so as to open the switch 13 simultaneously with such maximum changes of flux linkages within the core. The magneto further includes the usual condenser 15 which is connected between the leads 11 and 12 and which functions as a current storage reservoir and reduces arcing at the points of the breaker switch 13. A resistor 16 is connected in lead 11 in the usual manner for the purpose of reducing arcing at the contacts 17 of an associated rotary cam-actuated distributor which is diagrammatically illustrated at 18.

In reference to FIG. 1, it will be understood that for the purpose of simplicity, only one set of distributor contacts 17, and only one transformer 19 and spark plug 20 have been shown, whereas the usual ignition system for a multiple cylinder engine will include at least one set of distributor contacts, transformer and spark plug for each cylinder of the engine, all of which are supplied with operating current at properly timed intervals through the operation of the distributor 18. The ignition system further includes the usual master ignition switch 21 which, when closed, serves to ground the lead wire 11 to prevent the flow of current to the primary of the transformer 19 and to the spark plug 20. When the ignition switch 21 is open and the breaker switch 13 is opened and the distributor contacts 17 are closed, current generated in the magneto coil 10 may then pass to the primary of the transformer 19 and from the secondary of the transformer to the spark plug 20 where a spark is created to fire the associated cylinder of the engine.

It is here important to note that all of the structural elements and arrangements of parts heretofore described are common to and are found in the conventional magnetos and low tension ignition systems employed in aircraft and other relatively high power internal combustion engines for many years past, and as such, they form no part of the present invention, except as related to the improved auxiliary pole piece which will be hereinafter described.

Figure 2:
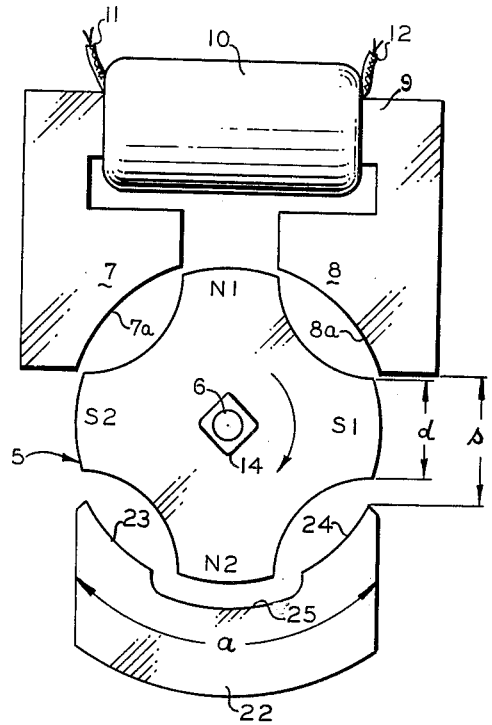
FIG. 2 is an enlarged front elevational view illustrating the position of the present auxiliary pole piece in relation to the rotating magnet, coil and coil core pole shoes of a magneto.
Figure 4:
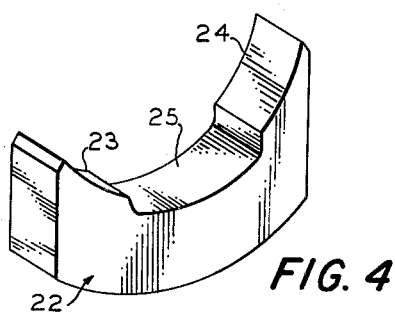
FIG. 4 is a perspective view of the auxiliary pole piece.

Referring particularly to FIG. 2 of the drawing, the auxiliary pole piece is designated by reference numeral 22 and may comprise either a solid or laminated body of non-permanent magnetic material, such as soft iron or steel. The pole piece 22 is of generally arcuate shape and is arranged and stationarily secured in closely adjacent relation to, and in the plane of rotation of, the magnet 5. Preferably, the auxiliary pole piece 22 is positioned in generally diametrically opposite relation to the coil core 9, and is formed adjacent the magnet 5 with two relatively spaced, arcuately concave surfaces 23 and 24 which are disposed in relatively closely spaced concentric relation to the circumferential outer surfaces of the poles of the magnet 5. The surfaces 23 and 24 of the pole piece 22 are connected by an intermediate cut-out or recessed surface 25.

As indicated in FIG. 2, the circumferential length dimension $a$ of the auxiliary pole piece 22 is such that the pole piece 22 will circumferentially span not more than two adjacent poles of the magnet 5. Preferably, the arc described by the inner surface of the pole piece 22 is slightly less than the length of the arc described by two adjacent poles of the magnet 5, as measured from the relatively remote ends of such poles. As further indicated in FIG. 2, the respective ends of the auxiliary pole piece 22 are spaced circumferentially around the magnet from the pole shoes 7 and 8 a distance $s$ which is substantially greater than the circumferential length $d$ of each of the poles of the magnet 5.

Thus, in the operation of the magneto, the auxiliary pole piece 22 provides a magnetic body in close proximity to the path of rotation of the poles of the magnet, and is arranged so that upon rotation of the magnet in a clockwise direction, as viewed in FIG. 2, the magnetic flux or fields set up between each set of adjacent poles of the magnet will be attracted or "stretched" toward the surfaces 23 and 24 of the auxiliary pole piece 22 as the rotating magnet approaches its E-gap or firing position. As shown in FIG. 2, the magnet 5 occupies a "neutral" position in which the pole $N_1$ of the magnet is disposed equidistantly between the pole shoes 7 and 8 of the coil core 9. In this neutral position, the magnetic flux through the core 9 is zero. However, as the magnet continues in rotation, the poles $N_1$ and $S_2$ move toward positions of full registry with the pole shoes 8 and 7, respectively. At the same time, the poles $S_1$ and $N_2$ of the magnet are moving closer toward the opposite end surfaces 24 and 23, respectively, of the pole piece 22.

As the pole $S_1$ approaches a position closer to the surface 24 of the pole piece 22 than to the pole shoe 8, the magnetic field between the poles $S_1$ and $N_2$ of the magnet is attracted more toward the opposite end surfaces 24 and 23, to thus exert forces upon the magnet tending to increase the speed of rotation thereof in a clockwise direction. As the pole $N_1$ of the magnet reaches a position approximately 11 degrees beyond the neutral position as shown in FIG. 2, the cam 14 opens the breaker switch 13 to thus permit current to flow from the coil 10 through the ignition circuit, rather than being recirculated back through the coil 10, as occurs when the switch 13 is closed. At this 11 degree position, the magnetic field between poles S and $N_2$ is directed almost entirely upon the ends of the auxiliary pole piece 22, with the result that a maximum of magnetic pull is exerted upon poles $S_1$ and $N_2$ in the direction of rotation of the magnet. Thus, due to the fact that the shaft 6 and magnet 5 are driven by an associated engine through a gear train, not shown, the inherent gear tooth clearance of the gear train permits the magnet and shaft 6 to rotate a limited distance independently of the engine which drives the same. Thus, the magnetic pull upon the magnet, created by the location of the auxiliary pole piece 22 causes the magnet to rotate in a clockwise direction (FIG. 2) at a higher rate of speed, as the respective poles of the magnet reach or closely approach the positions (E gap positions) at which they cause a maximum change or reversal of flux linkages in the core 9. The E gap positions of the magnet correspond to the firing position of the cam 14 to thus cause a maximum flow of current from the coil 10 to the particular spark plug 20 to be fired.

As will be obvious, during each complete revolution of the magnet 5, the poles $N_1$, $S_2$, $N_2$ and $S_1$ cause four maximum changes or reversals of flux linkages within the core 9. Thus, the rate of change of flux linkages within the core 9 is dependent upon the speed of rotation of the magnet 5. Accordingly, by increasing the speed of rotation of the magnet at the points at which a maximum change of flux linkages occurs within the core 9, the output efficiency of the magneto is greatly increased, particularly during relatively low speed operation of the associated engine.

Also, due to the spacing $s$ between the pole shoe 8 and the surface 24 of the auxiliary pole piece 22, which is greater than the circumferential length $d$ of each pole of the magnet, the lines of flux associated with the pole $S_1$ of the magnet 5 will be transferred almost entirely to the pole pece 22 as the magnet reaches a position at which the pole $S_1$ is closer to the pole piece 22 than to the pole shoe 8. By the same token, as the pole $S_2$ of the magnet 5 moves to a position at which it is closer to the pole shoe 7 than to the pole piece 22, substantially all lines of flux associated with the pole $S_2$ will be transferred from the pole piece 22 to the pole shoe 7. Thus, substantially all lines of flux associated with the active poles of the magnet, that is the two poles nearest the pole shoes 7 and 8, will be directed through the core 9, rather than having a portion of the lines of flux associated with the active poles reacting with the two inactive poles of the magnet, as would be the case in the absence of the present auxiliary pole piece 22.

Thus, it will be seen that the present invention provides a mechanically simple, yet highly efficient means for increasing the output efficiency of the conventional multiple rotor-type magneto, particularly at relatively slow engine speeds. The present auxiliary pole piece 22, due to its arrangement with respect to the rotating magnet and pole shoe components of the magneto, causes the rotating magnet or rotor to increase speed as the same reaches the positions at which a maximum change of flux linkages takes place in the coil core of the magneto, which positions correspond to the firing positions of the magneto and the associated engine. This increase in speed of the rotor serves directly to increase the voltage output of the magnetic coil at the times of fire of the engine cylinders. Also, the auxiliary pole piece, aside from increasing the speed of rotation of the magnet, materially increases the number of lines of flux through the coil core of the magneto and the rate at which such lines of flux pass through the coil core.

Having thus described this invention, what is claimed is:

1. In a magneto which includes a driven, rotary magnet having a plurality of radially projecting, circumferentially spaced poles of alternately opposite polarity and a relatively stationary coil-supporting core having a pair of relatively spaced pole shoes positioned in the plane of rotation of said magnet and terminating in arcuate surfaces disposed in closely adjacent, circumferentially spaced relation around an arcuate segment of said magnet, the spacing between the pole shoes of said core being substantially equal to the circumferential length of each pole of said magnet; that improvement which comprises a relatively stationary auxiliary pole piece of non-permanent, magnetic material positioned in the plane of rotation of said magnet and in closely adjacent relation to another arcuate segment of said magnet and spaced circumferentially around said maget from said coil-supporting core, said auxiliary pole piece being of a size to circumferentially span more than one but not more than two adjacent poles of said magnet and having the ends thereof disposed at a greater distance from the pole shoes of said coil-supporting core than the circumferential length of each of the poles of said magnet, said auxiliary pole piece being formed adjacent said magnet with two relatively separated arcuate surfaces connected by an intermediate cut-out portion.

2. A magneto as defined in claim 1, wherein the arcuate surfaces of said auxiliary pole piece are arranged in generally diametrically opposite relation to the pole shoes of said coil core.

References Cited by the Examiner

UNITED STATES PATENTS

| 1,327,375 | 1/20 | Dean | 310—70 X |
| 2,131,523 | 9/38 | Quintavalle | 310—156 |

FOREIGN PATENTS

| 700,829 | 1/31 | France. |

MILTON O. HIRSHFIELD, *Primary Examiner.*

ORIS L. RADER, *Examiner.*